(12) United States Patent
Takahashi (10) Patent No.: US 12,192,422 B2
(45) Date of Patent: Jan. 7, 2025

(54) IMAGE FORMING APPARATUS

(71) Applicant: CANON KABUSHIKI KAISHA, Tokyo (JP)

(72) Inventor: Kakeru Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 17/838,668

(22) Filed: Jun. 13, 2022

(65) Prior Publication Data
US 2022/0417375 A1   Dec. 29, 2022

(30) Foreign Application Priority Data

Jun. 29, 2021   (JP) ................................. 2021-108034

(51) Int. Cl.
*H04N 1/00* (2006.01)
*B65H 85/00* (2006.01)
*H04N 1/60* (2006.01)

(52) U.S. Cl.
CPC ..... *H04N 1/00602* (2013.01); *H04N 1/00594* (2013.01); *H04N 1/6075* (2013.01)

(58) Field of Classification Search
CPC ........... H04N 1/00602; H04N 1/00594; H04N 1/6075; B65H 85/00
See application file for complete search history.

(56) References Cited

U.S. PATENT DOCUMENTS

| | | | | |
|---|---|---|---|---|
| 4,496,984 A * | 1/1985 | Stoffel | ................. | H04N 1/0057 |
| | | | | 358/476 |
| 4,508,444 A * | 4/1985 | May | ....................... | B65H 9/166 |
| | | | | 399/362 |
| 6,219,511 B1 * | 4/2001 | Okada | .................... | G03G 15/60 |
| | | | | 358/496 |
| 7,667,879 B2 * | 2/2010 | Makino | .............. | H04N 1/00588 |
| | | | | 358/496 |
| 9,213,293 B2 * | 12/2015 | Tajima | ................. | H04N 1/6033 |
| 2019/0149679 A1 * | 5/2019 | Onecha | .............. | H04N 1/00628 |
| | | | | 358/498 |

FOREIGN PATENT DOCUMENTS

| | | |
|---|---|---|
| JP | 2009053346 A | 3/2009 |
| JP | 2013054324 A | 3/2013 |
| JP | 2014131205 A | 7/2014 |

\* cited by examiner

*Primary Examiner* — Thomas A Morrison
(74) *Attorney, Agent, or Firm* — ROSSI, KIMMS & McDOWELL LLP (57) ABSTRACT

An image reading apparatus includes a first roller including a first rotation shaft and a first roller portion, an image reading unit, a first guide portion, a second guide portion arranged downstream of the first roller in a sheet conveyance direction, the second guide portion being curved with respect to a direction orthogonal to an axial direction of a first rotation shaft and the sheet conveyance direction, and a second roller. A reading position is located in a region between a first straight line and a second straight line, the first straight line passing through a first end, in the axial direction, of the first roller portion and extending in the sheet conveyance direction, the second straight line passing through a second end, in the axial direction, of the first roller portion and extending in the sheet conveyance direction.

8 Claims, 9 Drawing Sheets

IMAGE FORMING APPARATUS

BACKGROUND OF THE INVENTION

Field of the Invention

The present invention relates to an image reading apparatus that read an image on a sheet and an image forming apparatus.

Description of the Related Art

For example, Japanese Patent Application Laid-Open No. 2009-53346 and Japanese Patent Application Laid-Open No. 2013-54324 propose image forming systems that forms an image on a sheet by an image forming apparatus, reads image information of the sheet by an image reading apparatus, and performs image adjustment, in particular, tint adjustment for the next-time image formation by the image forming apparatus. In the systems described in Japanese Patent Application Laid-Open No. 2009-53346 and Japanese Patent Application Laid-Open No. 2013-54324, patch images formed on a sheet are detected by a color sensor to create a profile, and tint adjustment is performed based on the profile.

In such tint adjustment, for example, it is necessary to satisfy color matching accuracy standards such as ISO 12647-7. For this end, the detection accuracy of the color sensor needs to be maintained at a high level. In order to maintain the detection accuracy of the color sensor at a high level, it is important to reduce the variation in the distance (focus position) between the sheet on which the image is formed and the sensor. Therefore, Japanese Patent Application Laid-Open No. 2014-131205 proposes that the in-focus position of a color sensor is set along the surface of a conveyance guide, and a conveyance roller presses a sheet against the guide surface of the conveyance guide so that the sheet is situated at the in-focus position.

Meanwhile, a color sensor in an image forming apparatus, for example, is not necessarily arranged on a linearly formed conveyance path as in Japanese Patent Application Laid-Open No. 2014-131205. For example, the conveyance path may need to be arranged at a curved portion on the downstream side in the sheet conveyance direction due to space restriction inside the image forming apparatus. In such a case, if the rigidity of the sheet is high, the sheet tends to be bent by the curved conveyance path in a direction opposite to the direction of pressing force of the pressing roller as described above, and there is a problem that it is difficult to stably position the sheet on the guide surface of the conveyance guide.

SUMMARY OF THE INVENTION

According to a first aspect of the present invention, an image reading apparatus includes a first roller including a first rotation shaft and a first roller portion rotatably supported by the first rotation shaft, the first roller portion being configured to contact a sheet and convey the sheet in a sheet conveyance direction, an image reading unit configured to read an image on the sheet conveyed at a reading position upstream of the first roller in the sheet conveyance direction, a first guide portion including a guide surface configured to guide the sheet so as to pass through the reading position, the guide surface being arranged upstream of the first roller in the sheet conveyance direction, a second guide portion arranged downstream of the first roller in the sheet conveyance direction, the second guide portion being curved with respect to a direction orthogonal to an axial direction of the first rotation shaft and the sheet conveyance direction to guide the sheet, and a second roller including a second rotation shaft and a second roller portion rotatably supported by the second rotation shaft, the second roller being configured to contact the sheet and press the sheet toward the guide surface of the first guide portion. The reading position is located in a region between a first straight line and a second straight line, the first straight line passing through a first end, in the axial direction, of the first roller portion and extending in the sheet conveyance direction, the second straight line passing through a second end, in the axial direction, of the first roller portion and extending in the sheet conveyance direction.

According to a second aspect of the present invention, an image reading apparatus includes a conveyance roller including a rotation shaft and a roller portion rotatably supported by the rotation shaft, the roller portion being configured to contact a sheet and convey the sheet in a sheet conveyance direction, an image reading unit configured to read an image on the sheet conveyed at a reading position upstream of the conveyance roller in the sheet conveyance direction, a guide portion including a guide surface configured to guide the sheet so as to pass through the reading position, the guide surface being arranged upstream of the conveyance roller in the sheet conveyance direction, an external force applying portion configured to apply a force in a direction away from the guide surface to the sheet guided by the guide portion, a pressing portion arranged at a position at least partially overlapping with the reading position in the sheet conveyance direction and configured to press the sheet toward the guide surface. The reading position is located in a region between a first straight line and a second straight line, the first straight line passing through a first end, in an axial direction of the rotation shaft, of the roller portion and extending in the sheet conveyance direction, the second straight line passing through a second end, in the axial direction, of the roller portion and extending in the sheet conveyance direction.

Further features of the present invention will become apparent from the following description of exemplary embodiments with reference to the attached drawings.

DESCRIPTION OF THE EMBODIMENTS

Hereinafter, an image reading apparatus and an image forming apparatus according to exemplary embodiments will be described with reference to the drawings. The dimensions, materials, shapes, relative arrangements, and the like of the components described in relation to the following exemplary embodiments are not intended to limit the scope of application of the present technology only to them unless otherwise specified.

Schematic Configuration of Image Forming Apparatus

Figure 1:
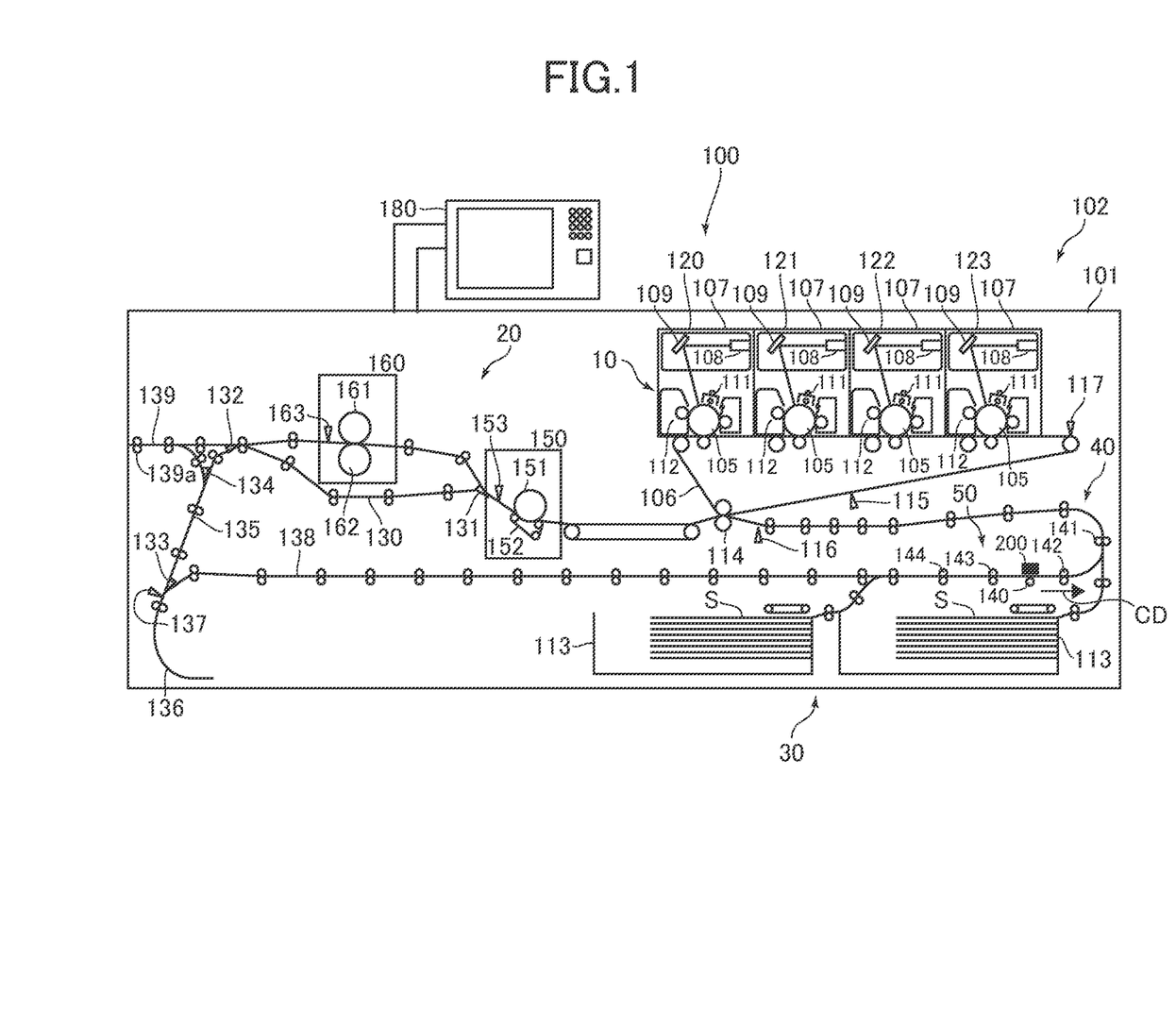
FIG. 1 is a schematic diagram of an image forming apparatus according to an exemplary embodiment.

FIG. 1 is a schematic view of an image forming apparatus 100 according to the present exemplary embodiment. In the present exemplary embodiment, the image forming apparatus 100 is an electrophotographic laser beam printer as an example. However, the present invention is not limited thereto, and the image forming apparatus may be an inkjet printer or a sublimation printer. In addition, the image forming apparatus 100 may be connected to processing apparatuses that perform various types of processing on a sheet on which an image has been formed by the image forming apparatus 100, and may constitute an image forming system together with these processing apparatuses. The processing apparatuses may be any apparatuses such as an inspection apparatus that inspects sheets, a hole making apparatus that makes holes in sheets, a binding apparatus (finisher) that staples sheets or binds sheets without staples, and a bookbinding apparatus that aligns and binds sheets.

A casing 101 of the image forming apparatus 100 contains an image forming engine 102, a control board housing (not illustrated) that houses a printer controller 103 (see FIG. 2) that controls the operation of the image forming apparatus 100, and an image reading mechanism 50. The image forming engine 102 as an image forming unit includes an optical processing mechanism 10 and a fixing processing mechanism 20 that form an image on a recording material by an image forming process, and a feed processing mechanism 30 and a conveyance processing mechanism 40 that feed and convey a rectangular sheet S used as a recording material. As the recording material, plain paper, thick paper, surface-treated paper such as coated paper or embossed paper, plastic films, or cloth sheets can be used.

The optical processing mechanism 10 includes stations 120, 121, 122, and 123 that form toner images of respective colors of yellow, magenta, cyan, and black, and an intermediate transfer belt 106. In each of the stations 120 to 123, a primary charger 111 charges the surface of a photosensitive drum 105, which is a drum-shaped photosensitive member. A laser scanner unit 107 performs exposure processing on the photosensitive drum 105 in accordance with a command signal generated on the basis of image data and transmitted to the laser scanner unit 107. The laser scanner unit 107 includes a laser driver that drives a laser beam emitted from a semiconductor laser (not illustrated) to turn on and off. The laser scanner unit 107 guides the laser beam from the semiconductor laser to the photosensitive drum 105 via a reflecting mirror 109 while distributing the laser beam in the main scanning direction (width direction of the sheet) by a rotating polygon mirror. As a result, an electrostatic latent image corresponding to the image data is formed on the surface of the photosensitive drum 105.

A developing device 112 contains a developer including toner inside, and supplies charged toner particles to the photosensitive drum 105. The toner particles adhere to the surface of the drum according to the surface potential distribution, whereby the electrostatic latent image borne on the photosensitive drum 105 is visualized as a toner image. The toner image borne on the photosensitive drum 105 is transferred (primarily transferred) to the intermediate transfer belt 106 to which a voltage having a polarity opposite to the normal charging polarity of the toner is applied. In the case of forming a color image, toner images formed by the four stations 120 to 123 are multiple-transferred so as to overlap each other on the intermediate transfer belt 106, whereby a full-color toner image is formed on the belt.

Meanwhile, the feed processing mechanism 30 feeds the sheets S one by one from a sheet storage 113 inserted into the casing 101 of the image forming apparatus 100 in a drawable manner toward a transfer roller 114. The toner image borne on the intermediate transfer belt 106 as an intermediate transfer member is transferred (secondarily transferred) to the sheet S by the transfer roller 114.

Around the intermediate transfer belt 106, an image formation start position detection sensor 115 for determining a print start position at the time of image formation, a feed timing sensor 116 for setting a feed timing of the sheet S, and a density sensor 117 are arranged. The density sensor 117 measures the density of a test patch image borne on the intermediate transfer belt 106. The printer controller 103 adjusts the operating conditions of the optical processing mechanism 10 (for example, the charging target potential of the primary charger 111 and the bias voltage of the developing device 112) based on the detection result of the density sensor 117.

The fixing processing mechanism 20 of the present exemplary embodiment includes a first fixing device 150 and a second fixing device 160. The first fixing device 150 includes a fixing roller 151 for applying heat to the sheet S, a pressure belt 152 for pressing the sheet S against the fixing roller 151, and a first post-fixing sensor 153 for detecting completion of fixing processing by the first fixing device 150. The fixing roller 151 is a hollow roller and has a heater inside. The first fixing device 150 applies heat and pressure to the toner image on the sheet S while nipping and conveying the sheet S by the fixing roller 151 and the pressure belt 152 which are a pair of rotary members. Accordingly, the toner particles are melted and then fixed, whereby the image is fixed on the sheet S.

The second fixing device 160 is arranged downstream of the first fixing device 150 in the conveyance path of the sheet S. The second fixing device 160 has a function of enhancing glossiness of the image fixed by the first fixing device 150 and securing fixability of the image to the sheet S. Similarly to the first fixing device 150, the second fixing device 160 includes a fixing roller 161 and a pressure roller 162 as a pair of rotary members that heat and pressurize the sheet S while conveying the sheet S, and a second post-fixing sensor 163 that detects completion of fixing processing by the second fixing device 160.

Depending on the type of the sheet S, the sheet S may not need to pass the second fixing device 160. In such a case, the image forming apparatus 100 includes a bypass conveyance path 130 for ejecting the sheet S without passing through the second fixing device 160 for the purpose of reducing the energy consumption. The sheet S having been sent from the first fixing device 150 is guided to either the second fixing device 160 or the bypass conveyance path 130 by a first switching flapper 131.

The sheet S having passed through the second fixing device 160 or the bypass conveyance path 130 is guided to either an ejection conveyance path 139 or a reverse conveyance path 135 by a second switching flapper 132. The position of the sheet S having been conveyed into the reverse conveyance path 135 is detected by a reverse sensor 137, and the downstream end (leading edge) and upstream end (trailing edge) of the sheet S in a sub-scanning direction (direction in which the sheet is conveyed) are exchanged by the switchback operation performed by a reverse unit 136. In the case of double-sided printing, the sheet S having the image formed on the front side is conveyed again toward the transfer roller 114 via a re-conveyance path 138 by a third switching flap 133 in a state where the leading and trailing ends of the sheet S are exchanged by the reverse unit 136, and the image is formed on the back side opposite to the front side.

As described above, the sheet S on which the image formation in the single-sided printing has been completed or the sheet S on which the image formation on the back side in the double-sided printing has been completed is ejected to the outside of the image forming apparatus 100 by an ejection roller 139a (ejection unit) provided in an ejection conveyance path 139. Between the reverse conveyance path 135 and the ejection conveyance path 139, a fourth switching flapper 134 capable of guiding the sheet S having been switched back by the reverse unit 136 toward the ejection conveyance path 139 is provided so that the front and back sides of the sheet S at the time of ejection can be selected.

Outline of Color Sensor

Next, description will be provided as to a schematic configuration of the image reading mechanism 50 that is the image reading apparatus of the present exemplary embodiment and reads patch images (hereinafter, simply referred to as "patches") formed on the sheet S by the image forming engine 102.

The quality of images provided by the image forming apparatus (hereinafter referred to as image quality) includes indicators such as granularity, in-plane uniformity, character quality, color reproducibility (including color stability), and the like, and it is said that the most important indicator is color reproducibility. A human has a memory about expected colors (in particular, human skin, blue sky, metal, and the like) based on experience. If a color exceeds its allowable range, he/she feels a sense of strangeness. These colors are called memory colors, and reproducibility of the colors is often required when a photograph or the like is output. There is also an increasing demand for higher color reproducibility (including stability) of image forming apparatuses, from office users who feel strangeness about not only memory color shifts but also color differences between printed documents and monitor display and graphic arts users who seeks color reproducibility of CG images.

In the image forming apparatus 100 of the present exemplary embodiment, when an image is formed on a sheet, hue adjustment is performed based on a profile. Specifically, when performing the hue adjustment, the image forming apparatus 100 first forms patches 220 (see FIG. 3) on the sheet S by the image forming engine 102. Thereafter, the color sensor 200 of the image reading mechanism 50 reads and colorimetrically measures the patches 220 on the sheet S, and transmits (feeds back) a colorimetric measurement result as image information to the printer controller 103 (see FIG. 2). The printer controller 103 creates a profile based on the colorimetric measurement result received from the color sensor 200, and performs hue adjustment when forming a job image on the sheet S based on the profile. The image forming apparatus 100 according to the present exemplary embodiment can improve image quality by performing such hue adjustment. In the present exemplary embodiment, the two color sensors 200A and 200B (see FIG. 4) are provided. However, when it is not necessary to distinguish between the two color sensors 200A and 200B, one or both of them are simply referred to as the color sensor 200.

Figure 3:
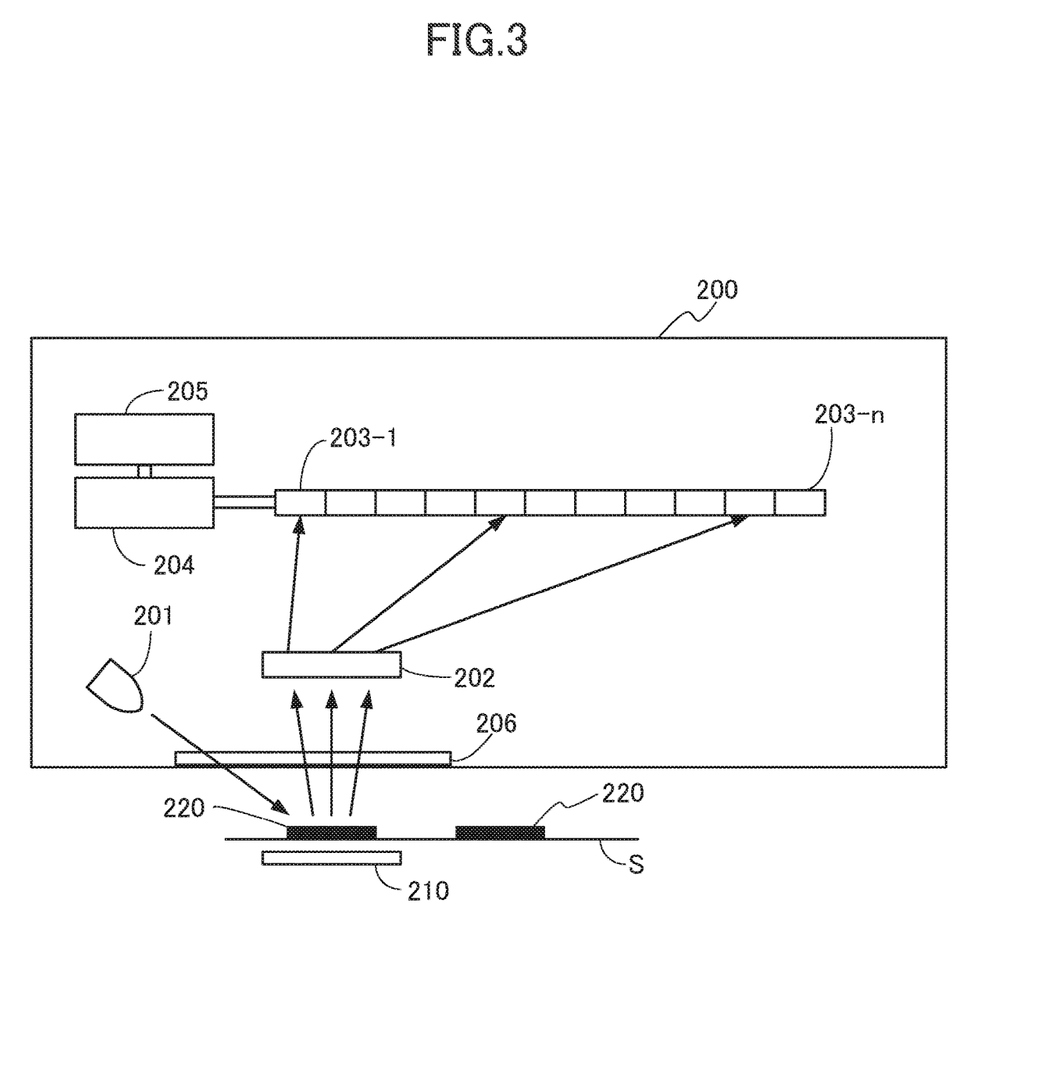
FIG. 3 is a schematic diagram illustrating a structure of a color sensor.

As illustrated in FIG. 3, the color sensor 200 includes a white LED 201 that irradiates the patches 220 of toner as image information formed on the sheet S with light, and a diffraction grating 202 that disperses light reflected from the patches 220 by wavelength. The color sensor 200 contains a lens 206 that condenses the light emitted from the white LED 201 on the patches 220 on the sheet S and condenses the light reflected from the patches 220 on the diffraction grating 202. The color sensor 200 also includes a line sensor 203 (203-1 to 203-$n$) including n pixels that detect light decomposed by wavelength by the diffraction grating 202. The color sensor 200 contains a calculation unit 204 that performs various calculations from the light intensity values of the pixels detected by the line sensor 203, and a memory 205 that stores various data.

Control Configuration of Image Forming System

Figure 2:
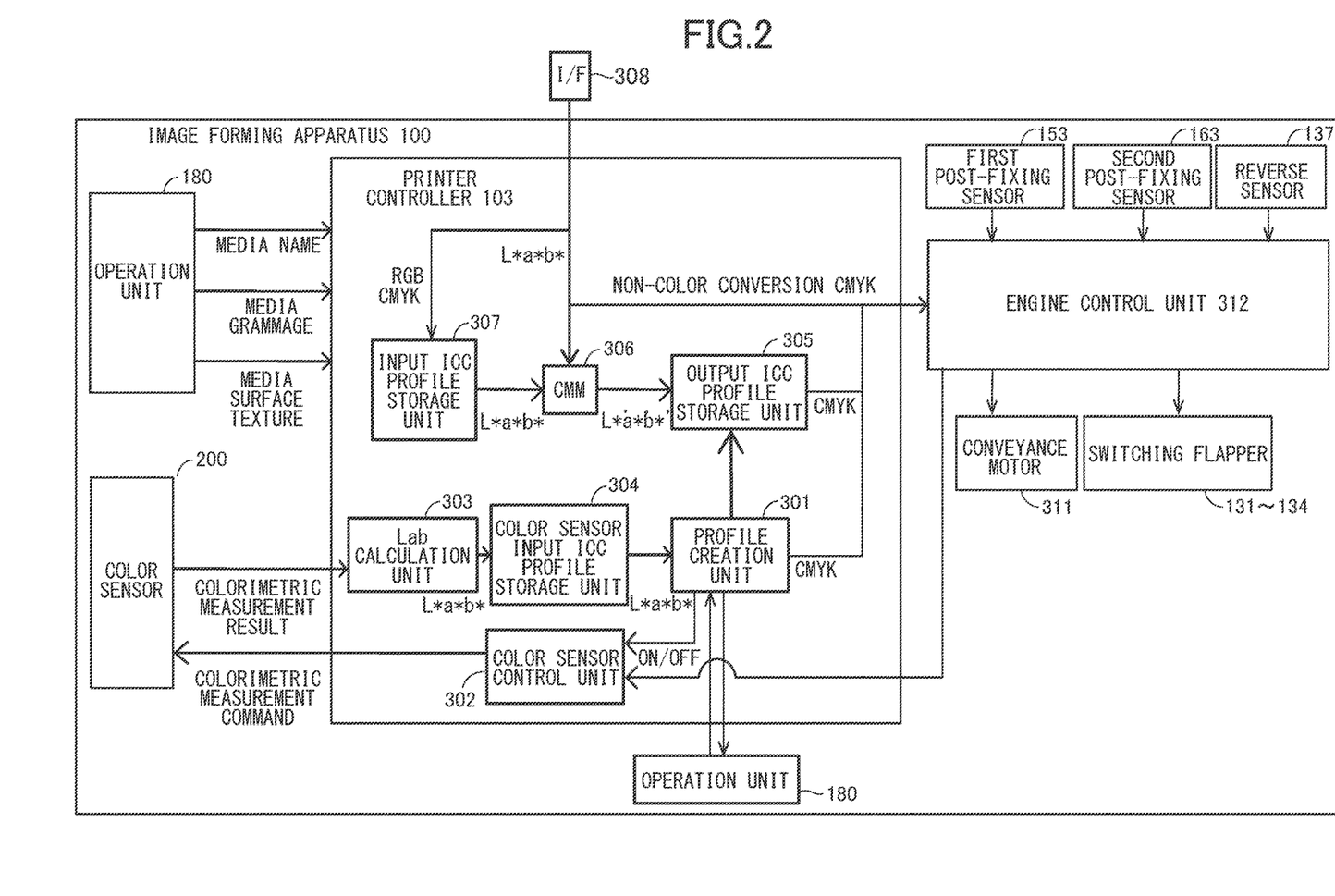
FIG. 2 is a block diagram illustrating a control configuration of the image forming apparatus.

As illustrated in FIG. 2, the image forming apparatus 100 includes a printer controller 103 that performs centralized control of operations, and an engine control unit 312 that controls the image forming engine 102 (see FIG. 1). The printer controller 103 is a control board on which at least one processor and one memory are mounted.

The engine control unit 312 causes the image forming engine 102 to perform the above-described image forming process to form an image on a sheet on the basis of a command signal from the printer controller 103 or the like. For example, the engine control unit 312 controls the operations of a conveyance motor 311, the first switching flapper 131 to the fourth switching flapper 134, based on detection signals from the first post-fixing sensor 153, the second post-fixing sensor 163, and the reverse sensor 137. The conveyance motor 311 is a motor as a drive source that drives a roller that conveys a sheet.

The image forming apparatus 100 is provided with an operation unit 180 serving as a user interface (see FIG. 1). The operation unit 180 includes a display that displays information to the user. The operation unit 180 also includes, for example, physical keys such as a numeric keypad and a print execution button, and a touch panel function of the display as input units that allow the user to input commands and data to the image forming apparatus 100. By operating the operation unit 180, the user can input, to the printer controller 103, information indicating sheet attributes such as the name, grammage, and presence or absence of surface treatment of sheets set in a certain sheet storage 113 (see FIG. 1).

The printer controller 103 is connected to an external wired or wireless communication network via an external interface (I/F) 308, and can communicate with an external computer (not illustrated). The printer controller 103 is also connected to a control circuit of an apparatus (not illustrated) that is connected to the image forming apparatus 100 and constitutes the image forming system. The printer controller 103 communicates with these apparatuses to coordinate the operations of the image forming apparatus 100 and the other apparatuses.

Hue Adjustment in Image Formation

Detailed description will be provided as to the hue adjustment (feedback configuration) in image formation when the color sensor 200 colorimetrically measures the patches 220 on the sheet S. That is, description will be provided as to a flow of control for creating a profile and outputting an image using the profile in the image forming apparatus 100 in the present exemplary embodiment. Used here is an International Color Consortium (ICC) profile which has been accepted in the market in recent years as a profile that realizes excellent color reproducibility. In the present exemplary embodiment, the ICC profile is used, but the present invention is not limited to this configuration. In place of the ICC profile, Color Rendering Dictionary (CRD) proposed by Adobe and adopted in PostScript Level 2 and subsequent versions or a color separation table in Photoshop can be used. In addition, CMYK simulation in ColorWise provided by Electronics For Imaging, Inc., which maintains black plate information, can also be used.

The image reading mechanism 50 according to the present exemplary embodiment includes the color sensor 200 that can measure the spectral reflectance as the reading unit described above. The color sensor 200 can measure spectral reflectance and convert the same into chromaticity to create a color conversion profile by itself. Then, the color sensor 200 performs the internal conversion color treatment using the created color conversion profile.

Measurement by Color Sensor and Calculation of Chromaticity

Here, calculation of chromaticity will be described. In the signal colorimetrically measured and generated by the color sensor 200, the light emitted from the white LED hits the measurement target object, the reflected light is dispersed by the diffraction grating, and the spectral reflectance is detected on the CMOS sensor arranged in each wavelength region of 380 nm to 720 nm. In the present exemplary embodiment, a Lab calculation unit 303 illustrated in FIG. 2 converts the spectral reflectance into L*a*b* via a color matching function or the like as specified in CIE in order to improve the detection calculation accuracy. Then, a relationship between the patch information converted into L*a*b* and the signal value of the patches is obtained, and an ICC profile that is a color conversion profile is created as follows.

Profile Creation Process

The user operates the operation unit 180 to perform a color profile creation process at the time of part replacement by a customer engineer, before a job of which color matching accuracy is required, or when the user wants to know the tints of the final output product at the design conceptual stage.

The profile creation process is performed in the printer controller 103 illustrated in the control block diagram of FIG. 2. First, a profile creation instruction is input to a profile creation unit 301 via the operation unit 180. The profile creation unit 301 sends a signal to the engine control unit 312 to output a cyan magenta yellow black (CMYK) color chart of the ISO 12642 test form without passing through the profile.

In the image forming apparatus 100, the ISO 12642 test form (patches 220) is transferred and fixed to the sheet S through processes such as charging, exposure, development, transfer, and fixing, and the sheet S is conveyed to the re-conveyance path 138 and colorimetrically measured by the color sensor 200. The spectral reflectance data of the colorimetric patches 220 is input to the printer controller 103, converted into L*a*b* data by the Lab calculation unit 303, stored in a color sensor input ICC profile storage unit 304, and input to the profile creation unit 301. The spectral reflectance data may be converted into the CIE 1931 XYZ color system for color space signals independent of non-L*a*b* devices.

The profile creation unit 301 further creates an output ICC profile based on a relationship between the output CMYK signal and the input L*a*b* data, and replaces the output ICC profile stored in an output ICC profile storage unit 305 with the created output ICC profile. The ISO 12642 test form includes CMYK color signal patches covering a color reproduction range that can be output by a general copying machine, and creates a color conversion table from a relationship between each color signal value and a colorimetric L*a*b* value. That is, a conversion table (A2Bx tag) of CMYK to Lab is created. An inverse conversion table (B2Ax tag) is created on the basis of this conversion table.

The ICC profile includes a header, a tag, and data thereof. The tag includes not only the above-mentioned color conversion table but also a (gamt) tag that describes whether colors expressed by a white point (Wtpt) and Lab values defined inside the profile are within or out of the reproducible reproduction range of hard copy.

A profile creation command may be input through the external interface 308 such as an externally connected device such as a PC. In this case, the transmission external device may be allowed to upload the created output ICC profile so that the user can perform color conversion in an application corresponding to the ICC profile.

Color Conversion Process

Color conversion in normal color output will be described. Image signal input on the assumption of an RGB signal value input via the external interface 308 such as a scanner unit or a standard print CMYK signal value such as JapanColor is sent to an input ICC profile storage unit 307 for external input. The input ICC profile storage unit 307 perform conversion of RGB to L*a*b* or CMYK to L*a*b* conversion according to the image signal input from the external interface 308. The input ICC profile includes a one-dimensional lookup table (LUT) that controls the gamma of an input signal, a multi-order color LUT called direct mapping, and a one-dimensional LUT that controls the gamma of generated conversion data. These lookup tables are used to convert the device-dependent color space into device-independent L*a*b* data.

The image signal converted into the L*a*b* chromaticity coordinates is input to a color management module (CMM) 306. Then, GUMAT conversion is performed for mapping a mismatch between the read color space of the external interface 308 by the scanner unit or the like as the input device and the output color reproduction range of the image forming apparatus 100 as the output device. In addition, color conversion for adjusting a light source type mismatch (also referred to as a mismatch of color temperature setting) when the light source type at the time of input and the output are observed, black character determination, and the like are also performed. As a result, the L*a*b* data is converted into L*'a*'b*'data, and the L*'a*'b*'data is input to the profile storage unit 305. The profile created as described above is stored in the profile storage unit 305, subjected to color conversion by the newly created ICC profile, converted into a CMYK signal depending on the output device, and output to the engine control unit 312.

As described above, the ICC profile is created on the basis of the image information colorimetrically measured (read) by the color sensor 200, and the image to be formed on the sheet S is corrected by the image forming engine 102 of the image forming apparatus 100 on the basis of the ICC profile. This makes it possible to execute hue adjustment for performing feedback based on the patches 220 on the sheet S.

Detailed Structure of Image Reading Mechanism 50

Figure 4:
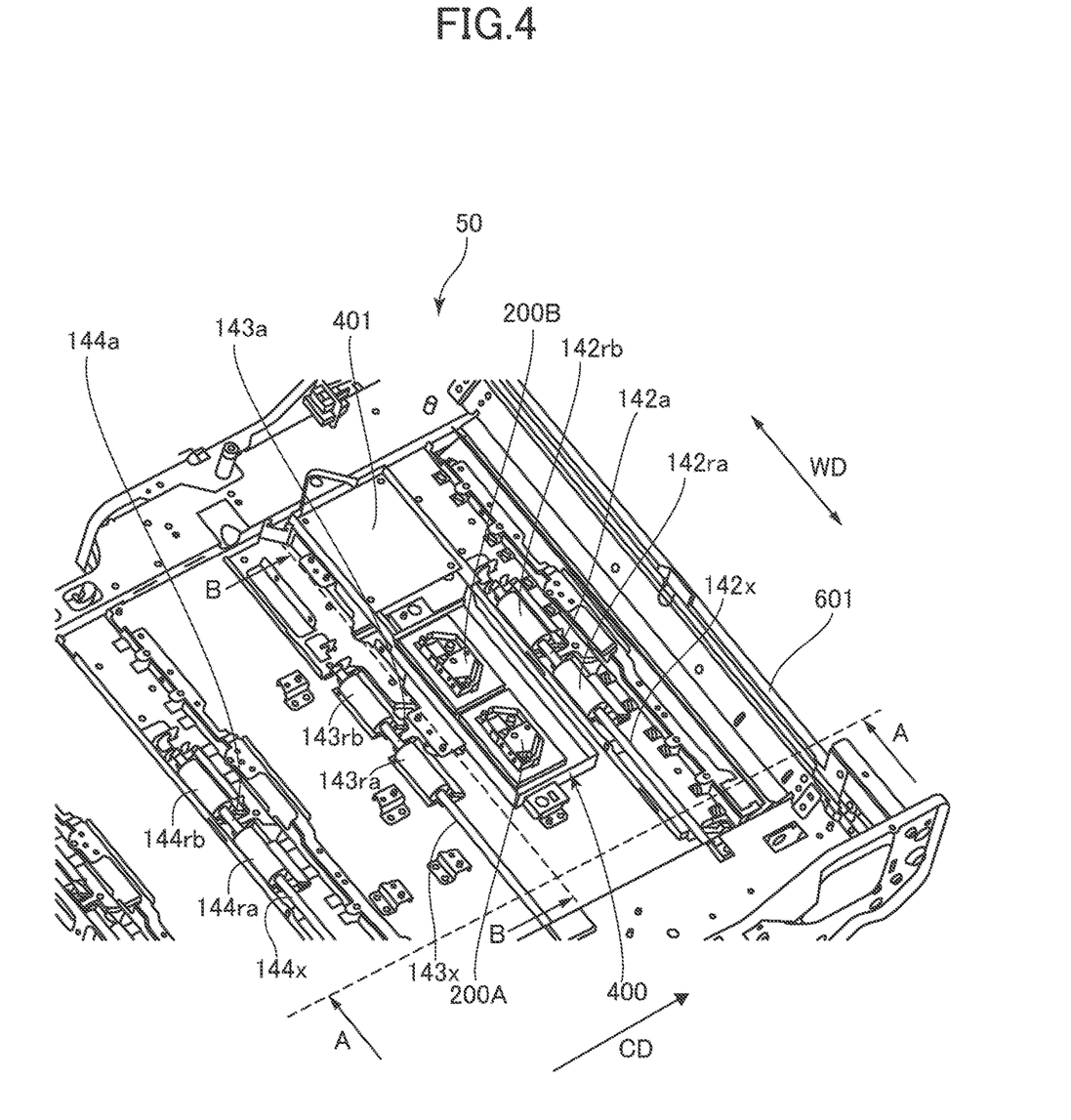
FIG. 4 is a perspective view of a double-sided conveyance unit to which the color sensor is attached.
Figure 5:
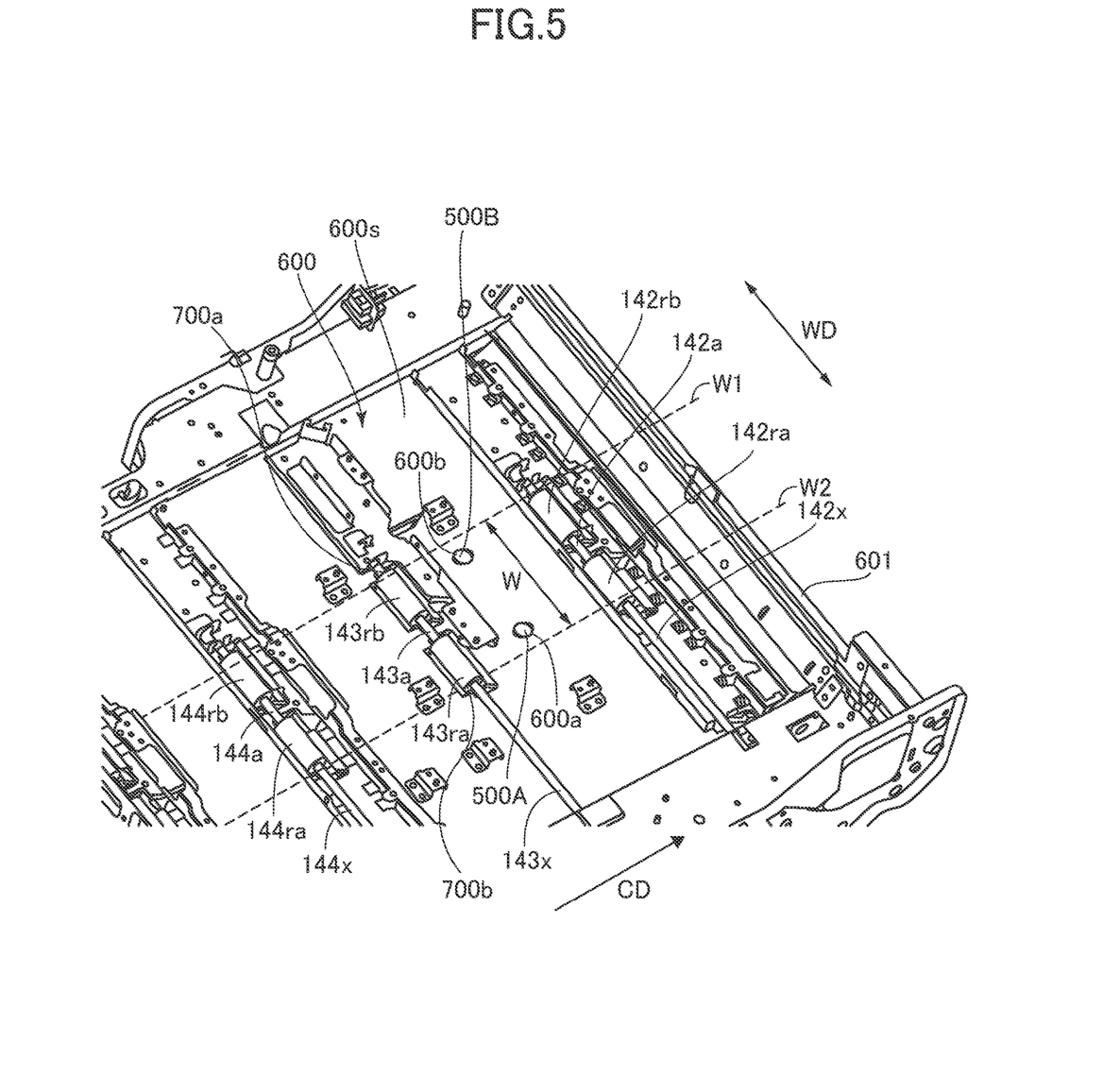
FIG. 5 is a perspective view of a double-sided conveyance unit from which the color sensor is detached.
Figure 6:
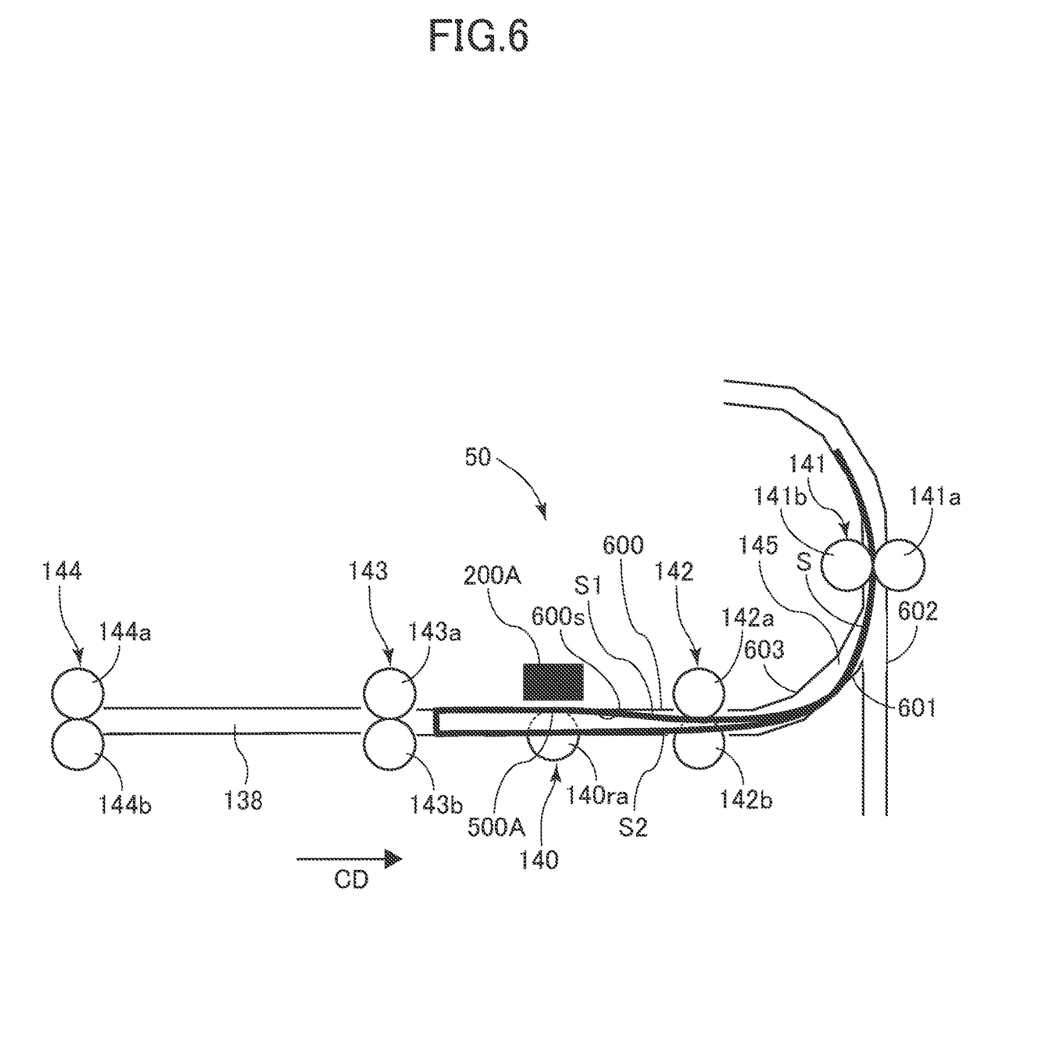
FIG. 6 is a schematic cross-sectional diagram illustrating a state of a sheet at the time of image reading when viewed in an axial direction.
Figure 7:
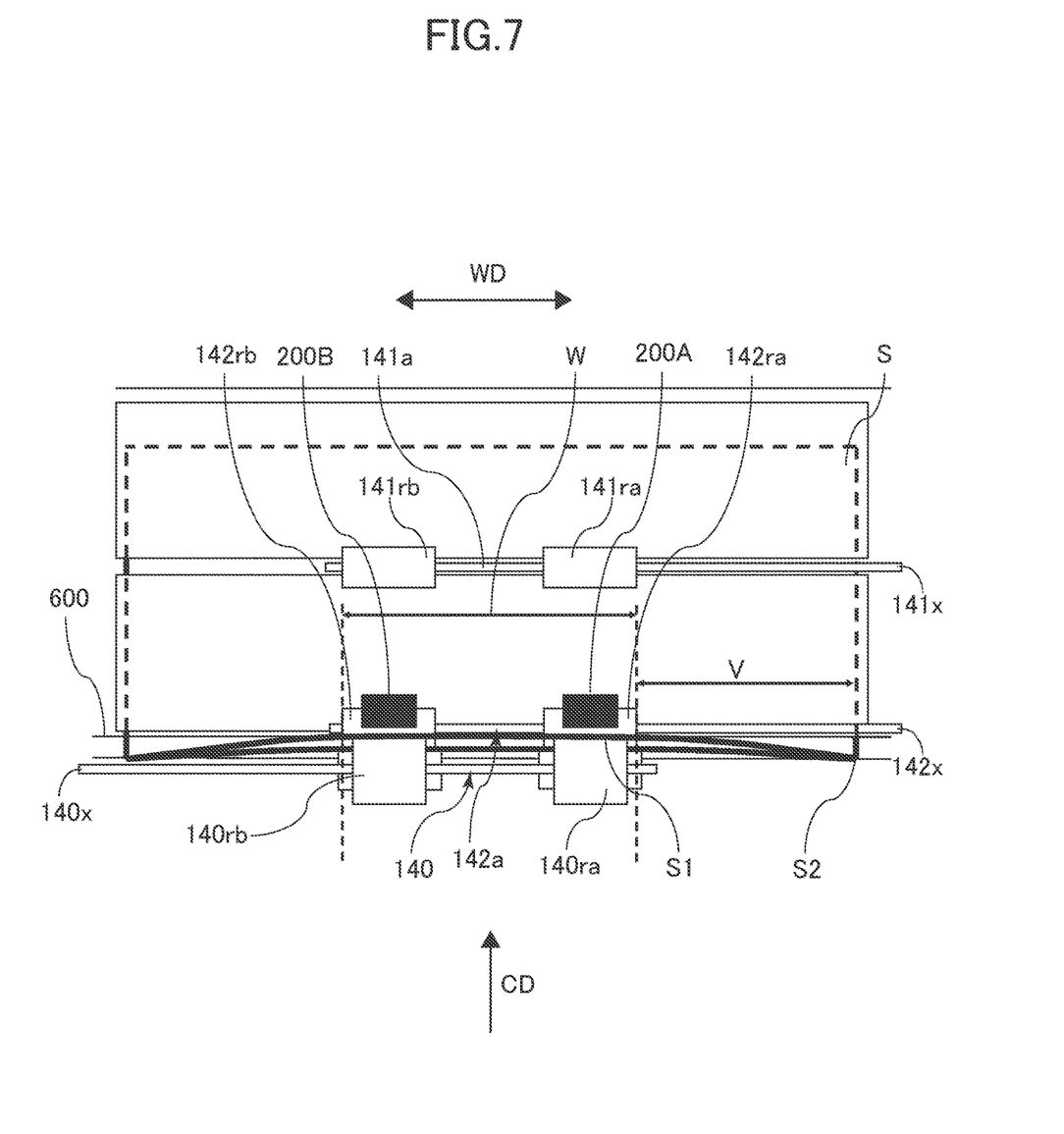
FIG. 7 is a schematic cross-sectional diagram illustrating a state of a sheet at the time of image reading when viewed in a conveyance direction.

Next, details of the image reading mechanism 50 as a colorimetric unit that performs colorimetry in order to perform hue adjustment as described above in the image forming apparatus 100 of the present embodiment will be described using FIGS. 4 to 9 while referring to FIG. 1. FIG. 4 illustrates the image reading mechanism 50 to which the color sensor unit 400 including the two color sensors 200A and 200B and the sensor substrate 401 is attached. Conversely, FIG. 5 illustrates the image reading mechanism 50 from which the color sensor unit 400 as the image reading unit is detached. FIG. 6 is a cross-sectional view taken along line A in FIG. 4, and FIG. 7 is a cross-sectional view taken along line B in FIG. 4.

As illustrated in FIG. 1, the image reading mechanism 50 includes a part of the re-conveyance path 138 and conveyance roller pairs 141, 142, 143, and 144, and is configured to convey the sheet S by these components. On the downstream side of a sheet conveyance direction CD of the conveyance roller pair 142, a curved conveyance path 145 to the conveyance roller pair 141, which is a part of the re-conveyance path 138, is curved to direct the sheet S toward the transfer roller 114. The image reading mechanism 50 further includes the color sensor 200 that reads an image (patches 220) on the conveyed sheet S, on the upstream side of the conveyance roller pair 142 in the sheet conveyance direction CD. The image reading mechanism 50 includes a pressing roller 140 that presses the sheet S toward the color sensor 200.

Specifically, as illustrated in FIG. 6, the conveyance roller pair 141 includes a driving roller 141b driven by the driving force of the conveyance motor 311, and a driven roller 141a driven to rotate by the driving of the driving roller 141b. As illustrated in FIG. 7, the driven roller 141a of the conveyance roller pair 141 includes a rotation shaft 141x rotatably supported and a plurality of roller parts 141ra and 141rb arranged on the rotation shaft 141x. The roller parts 141ra and 141rb come into contact with the sheet S to nip and convey the sheet S together with the driving roller 141b.

Similarly, as illustrated in FIG. 6, the conveyance roller pair 142 includes a driving roller 142b driven by the driving force of the conveyance motor 311, and a driven roller 142a as a first roller driven to rotate by the driving of the driving roller 142b. As illustrated in FIGS. 4, 5, and 7, the driven roller 142a of the conveyance roller pair 142 includes a rotation shaft 142x as a first rotation shaft rotatably supported, and roller parts 142ra and 142rb as first roller portion arranged in parallel with the rotation shaft 142x. The roller parts 142ra and 142rb come into contact with the sheet S to nip and convey the sheet S together with the driving roller 142b. The roller part 142ra constitutes a first roller part, and the roller part 142rb constitutes a second roller part.

Similarly, as illustrated in FIG. 6, the conveyance roller pair 143 includes a driving roller 143b driven by the driving force of the conveyance motor 311, and a driven roller 143a driven to rotate by the driving of the driving roller 143b. As illustrated in FIGS. 4 and 5, the driven roller 143a of the conveyance roller pair 143 includes a rotation shaft 143x rotatably supported and a plurality of roller parts 143ra and 143rb arranged on the rotation shaft 143x. The roller parts 143ra and 143rb come into contact with the sheet S to nip and convey the sheet S together with the driving roller 143b.

Similarly, as illustrated in FIG. 6, the conveyance roller pair 144 includes a driving roller 144b driven by the driving force of the conveyance motor 311, and a driven roller 144a driven to rotate by the driving of the driving roller 144b. As illustrated in FIGS. 4 and 5, the driven roller 144a of the conveyance roller pair 144 includes a rotation shaft 144x rotatably supported and a plurality of roller parts 144ra and 144rb arranged on the rotation shaft 144x. The roller parts 144ra and 144rb come into contact with the sheet S to nip and convey the sheet S together with the driving roller 144b.

As illustrated in FIG. 4, the color sensor unit 400 according to the present embodiment includes the two color sensors 200A and 200B and the sensor substrate 401. As illustrated in FIG. 5, a conveyance guide 600 as a first guide portion (guide portion) is arranged between the driven roller 142a and the driven roller 143a in the sheet conveyance direction CD below the color sensor unit 400. The conveyance guide 600 is configured to cover the color sensor unit 400. The conveyance guide 600 has a guide surface 600s which is a front surface thereof and constitutes one surface of the re-conveyance path 138, that is, the conveyance guide 600 forms the re-conveyance path 138.

The conveyance guide 600 has through holes 600a and 600b formed in correspondence with reading positions 500A and 500B at which the two color sensors 200A and 200B perform reading by emitting light and collecting light reflected on the sheet S. That is, the color sensor 200A as the first image reading portion reads the image on the sheet at the reading position 500A as the first reading position, and the color sensor 200B as the second image reading portion reads the image on the sheet at the reading position 500B as the second reading position. The color sensors 200A and 200B have focal positions at the opening portions of the through holes 600a and 600b in the guide surfaces 600s. That is, the color sensors 200A and 200B are configured such that the accuracy of image reading is the best when the sheet S is slid in contact with the guide surface 600s. In the present embodiment, the reading positions 500A and 500B mean positions in the sheet conveyance direction CD and the axial direction WD (sheet width direction) of the rotation shaft 142x, that is, positions in plane coordinates on the guide surface 600s. Therefore, as for the reading positions 500A and 500B, the focal positions mean positions in the three-dimensional coordinates coinciding with the guide surface 600s in the direction perpendicular to the guide surface 600s.

The pressing roller 140 as the second roller (pressing unit) is arranged at a position facing the guide surface 600s of the conveyance guide 600. As illustrated in FIGS. 6 and 7, the pressing roller 140 includes a rotation shaft 140x as a second rotation shaft rotatably supported, and a plurality of roller parts 140ra and 140rb as second roller portion arranged in parallel with the rotation shaft 140x. The roller parts 140ra and 140rb are arranged at positions respectively overlapping the reading positions 500A and 500B in the vertical direction of the guide surface 600s, that is, facing the reading positions 500A and 500B. The rotation shaft 140x is pressed toward the guide surface 600s by a pressing unit such as a spring (not illustrated), and the roller parts 140ra and 140rb come into contact with the sheet S and rotate while pressing and nipping the sheet S between the roller parts 140ra and 140rb and the guide surface 600s. In the present embodiment, the rotation shaft 140x is pressed against the guide surface 600s by a pressing unit (not illustrated). However, the roller parts 140ra and 140rb may be formed of members that are easily elastically deformed such as sponge, and the sheet S may be pressed against the guide surface 600s.

In the present embodiment, the two roller parts of the driven rollers 141a, 142a, 143a, and 144a and the two roller parts of the pressing roller 140 are arranged in parallel in the same number on their rotation shafts. These roller parts are arranged at positions overlapping in the axial direction WD when viewed from the sheet conveyance direction CD.

On the other hand, as illustrated in FIG. 6, conveyance guides 601, 602, and 603 as second guide portions are arranged on the downstream side of the conveyance roller pair 142 in the sheet conveyance direction CD. These conveyance guides 601, 602, and 603 form a curved conveyance path 145 as a second conveyance path that is curved with respect to a direction orthogonal to the axial direction WD (see FIG. 4) of the rotation shaft 142$x$ and the sheet conveyance direction CD, that is, with respect to the vertical direction when viewed from the width direction of the sheet to guide the sheet S. The curved conveyance path 145 is a part of the re-conveyance path 138.

Then, the posture of the sheet S at the time of image reading by the image reading mechanism 50 configured as described above will be described. As illustrated in FIGS. 6 and 7, when the patches 220 (see FIG. 3) on the sheet S are read by the image reading mechanism 50, the sheet S is conveyed by the conveyance roller pairs 141, 142, 143, and 144. At this time, the sheet S is pressed against the guide surface 600$s$ of the conveyance guide 600 by the pressing roller 140, and the patches 220 on the sheet S pass through the focal positions at the reading positions 500A and 500B of the color sensors 200A and 200B.

A center portion S1 of the sheet S is pressed against the guide surface 600$s$ by the pressing roller 140 when passing through the reading positions 500A and 500B, and an end S2 of the sheet S hangs down by its own weight and is separated from the guide surface 600$s$. When the leading end of the sheet S moves to the downstream side of the sheet conveyance direction CD beyond the conveyance roller pair 142 and further moves ahead in the curved conveyance path 145, the leading end of the sheet S goes upward (the pressing direction of the pressing roller 140). Then, the widthwise portions of the sheet S near the reading positions 500A and 500B are pressed downward due to the stiffness of the sheet S.

However, the roller parts 142$ra$ and 142$rb$ of the driven roller 142$a$ in the conveyance roller pair 142 and the roller parts (not illustrated) of the driving roller 142$b$ nip the sheet S between the curved conveyance path 145 and the reading positions 500A and 500B in the sheet conveyance direction CD. Therefore, as illustrated in FIGS. 5 and 7, in a range W in which the roller parts 142$ra$ and 142$rb$ are arranged in the axial direction WD (width direction) of the rotation shaft 142$x$ when viewed from the sheet conveyance direction CD, the center portion S1 of the sheet S can be easily pressed against the guide surface 600$s$ by the pressing roller 140.

On the other hand, in a range V located outside the range W in the axial direction WD, the influence of the nipping force of the conveyance roller pair 142 becomes weaker with increasing proximity to the end S2 of the sheet S, and the downward pressing force received by the sheet S in the curved conveyance path 145 becomes greater due to the stiffness of the sheet S. Therefore, as illustrated in FIGS. 6 and 7, the end S2 of the sheet S is largely separated from the guide surface 600$s$.

Therefore, in the present embodiment, as illustrated in FIG. 5, the reading positions 500A and 500B are located within the range W serving as a region between a first straight line W1 passing through a first end 700$a$, in the axial direction WD, of the roller part 142$ra$ and extending in the sheet conveyance direction CD and a second straight line W2 passing through the second end 700$b$, in the axial direction WD, of the roller part 142$rb$ and extending in the sheet conveyance direction CD. In other words, the reading positions 500A and 500B are arranged between the end portion (W1) on one side and the end portion (W2) on the other side in the range W. Specifically, the reading position 500A as the first reading position is arranged at a position overlapping the roller part 142$ra$ in the axial direction WD when viewed from the sheet conveyance direction CD. The reading position 500B as the second reading position is arranged at a position overlapping the roller part 142$rb$ in the axial direction WD when viewed from the sheet conveyance direction CD. As illustrated in FIG. 7, the roller part 140$ra$ as a third roller part of the pressing roller 140 is arranged at a position overlapping the roller part 142$ra$ of the conveyance roller pair 142 when viewed in the sheet conveyance direction CD. The roller part 140$rb$ as the fourth roller part is arranged at a position overlapping the roller part 142$rb$ when viewed in the sheet conveyance direction CD. As a result, even when the leading end of the sheet S is conveyed in the curved conveyance path 145, the sheet S can be pressed by the roller parts 140$ra$ and 140$rb$ of the pressing roller 140 and stably positioned at the focal positions of the reading positions 500A and 500B. Therefore, the accuracy of image reading can be improved.

DESCRIPTION OF COMPARATIVE EXAMPLE

Figure 8:
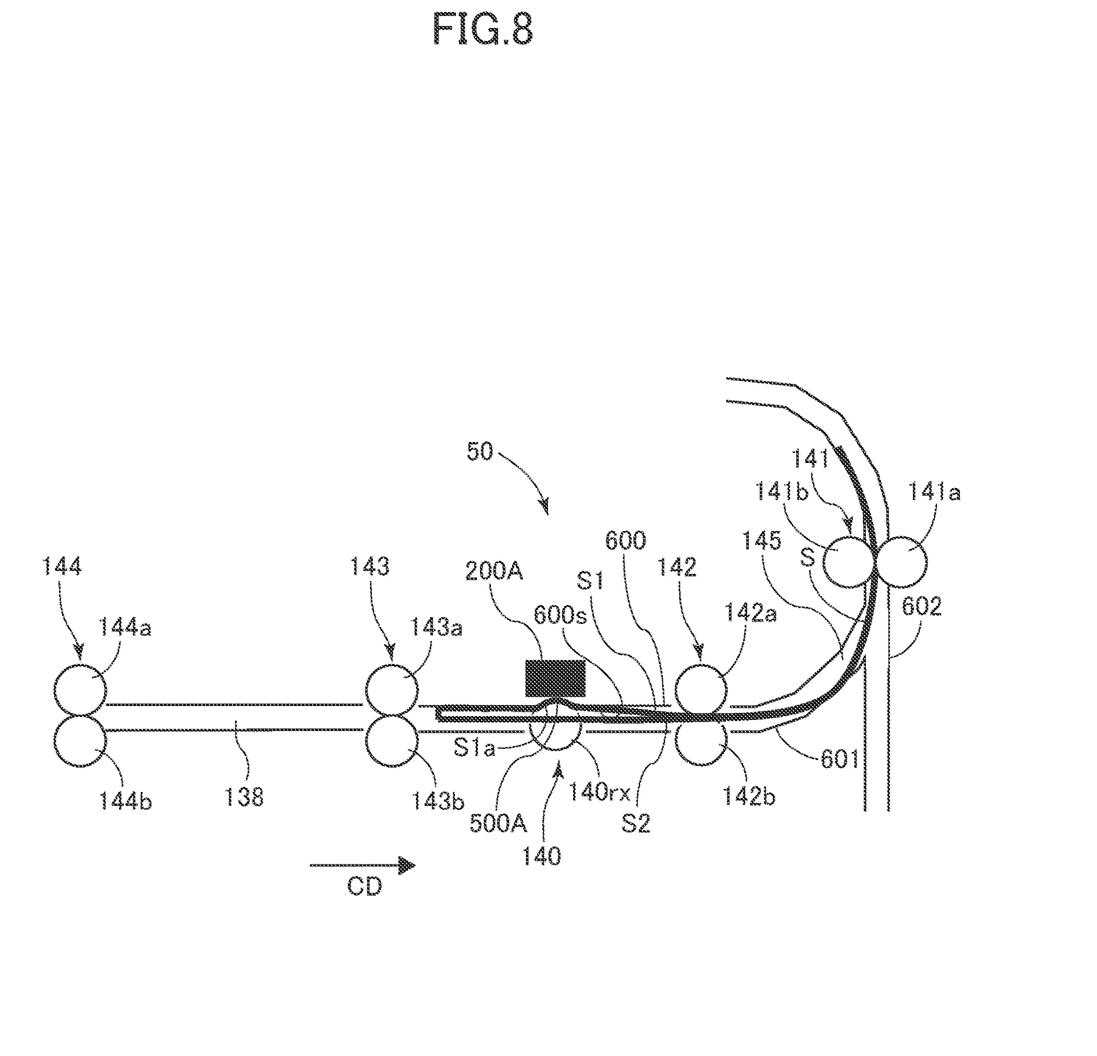
FIG. 8 is a schematic cross-sectional view illustrating a state of a sheet with low rigidity at the time of image reading when viewed in the axial direction.

By the way, it is conceivable that increasing the pressing force of the pressing roller 140 will make the end S2 of the sheet S outside the range W in the axial direction WD closer to the guide surface 600$s$. However, it is difficult to cope with sheets S different in stiffness. That is, as illustrated in FIG. 8, it is assumed that the pressing force of a roller part 140$rx$ of the pressing roller 140 is stronger than that in the present embodiment (see FIG. 6), and the stiffness of the sheet S is lower. In this case, at the reading position 500A, for example, a part S1$a$ of the sheet S will enter the through hole 600$a$ (see FIG. 5) and swell. Therefore, when the stiffness of the sheet S is low, the sheet S is not at the focal position, and the accuracy of image reading cannot be improved.

Figure 9:
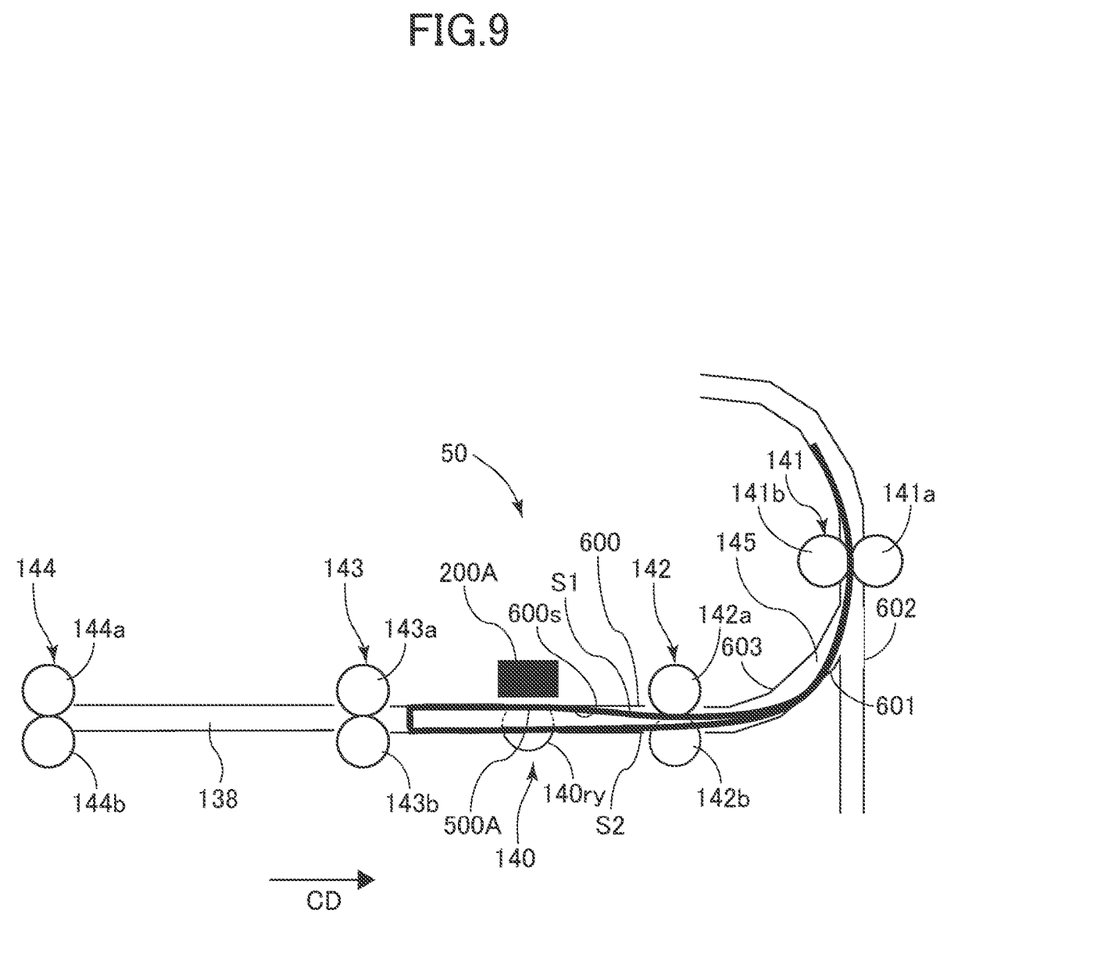
FIG. 9 is a schematic cross-sectional view illustrating a state of a sheet with high rigidity at the time of image reading when viewed in the axial direction.

Furthermore, in order not to cause such swelling, as illustrated in FIG. 9, it is conceivable to strengthen the pressing force of the pressing roller 140 and configure a roller part 140$ry$ with a member that is easily elastically deformed, such as sponge. However, as illustrated in FIG. 9, when the stiffness of the sheet S is high, the pressing force received by the sheet S from the curved conveyance path 145 increases based on the stiffness of the sheet S. Therefore, the roller part 140$ry$ is greatly deformed, thereby making it difficult to bring the end S2 of the sheet S close to the guide surface 600$s$. Therefore, even if the end S2 of the sheet S is brought closer to the guide surface 600$s$ by increasing the pressing force of the pressing roller 140 and the reading position of the color sensor 200 is arranged in the range V, it is not possible to cope with sheets different in stiffness, and the accuracy of image reading becomes not good.

Other Embodiments

In the present embodiment described above, two color sensors are arranged, but the present invention is not limited thereto. For example, at the time of reading a specified number of patches required for hue adjustment, in order to reduce the number of sheets on which patches are formed, it is conceivable to arrange a large number of color sensors or arrange color sensor(s) so as to be movable in the axial direction WD, for example. In this case, it is conceivable to widen the range W in which the roller parts 142*ra* and 142*rb* of the conveyance roller pair 142 are arranged, increase the widths of the roller parts, or increase the number of roller parts in accordance with the range in which the color sensor(s) is arranged or the moving range of the color sensor(s).

In the present embodiment, the two roller parts 142*ra* and 142*rb* of the conveyance roller pair 142 are provided. However, the present invention is not limited thereto, and for example, one roller part having a width corresponding to the range W may be provided or three or more roller parts may be arranged in the range W.

Furthermore, in the present embodiment, the color sensor includes the two color sensors 200A and 200B. However, the present invention is not limited thereto, and the number of color sensors may be one or three or more.

In the present embodiment, the reading position of the color sensor is arranged at a position overlapping any of the roller parts 142*ra* and 142*rb* of the conveyance roller pair 142 when viewed from the sheet conveyance direction CD. However, the present invention is not limited thereto, and the reading position of the color sensor may be arranged between the roller parts 142*ra* and 142*rb* in the axial direction WD when viewed from the sheet conveyance direction CD. Also in this case, the center portion S1 of the sheet S is hardly separated from the guide surface 600*s*, and the sheet S can be stably positioned at the focal position at the reading position.

In the present embodiment, the curved conveyance path 145 is curved in the same direction as the pressing direction of the pressing roller 140 on the downstream side of the conveyance roller pair 142 in the sheet conveyance direction CD. However, the present invention is not limited thereto, and the shape of the curved conveyance path 145 may be any shape, that is, may be any shape as long as a force in a direction away from the focal position is generated at the reading position of the color sensor as the leading end of the sheet S is conveyed and guided.

In the present embodiment, the force in the direction away from the focal position (guide surface 600*s*) is applied at the reading position of the color sensor as the leading end of the sheet S is conveyed and guided in the curved conveyance path 145 as an external force applying unit. However, the present invention is not limited thereto, and for example, a tangent line to the nip of the conveyance roller pair 142 when viewed from the axial direction WD may be inclined with respect to the guide surface 600*s* and separated from the focal position at the reading position. In this case, as the sheet is nipped by the nip of the conveyance roller pair 142 as the external force applying unit, the force in a direction away from the focal position is applied at the reading position of the color sensor.

In addition, in the present embodiment, in the conveyance roller pairs 141, 142, 143, and 144, the rollers on the side with the color sensor 200 arranged in the re-conveyance path 138 are driven rollers. On the contrary, however, the rollers on the side with the color sensor 200 arranged in the re-conveyance path 138 may be driving rollers.

In the present embodiment, the pressing roller 140 is a driven roller that is not connected to a drive source. However, the present invention is not limited thereto, and the pressing roller 140 may be a driving roller connected to a drive source such as a conveyance motor. Furthermore, in the present embodiment, the sheet is pressed against the guide surface 600*s* by the pressing roller 140. However, the sheet may be pressed by a pressing portion such as a pressing plate that is biased by a spring or the like and has a fluororesin-processed slippery surface.

In the present embodiment, the color sensor 200 is used as an image reading unit to perform hue adjustment in the image forming apparatus. However, the present invention is not limited thereto, and the image reading unit may perform position adjustment, density adjustment, and the like for image formation. Furthermore, the image reading unit may be a monochrome sensor. In this case, the image reading unit can perform position adjustment, density adjustment, and the like for image formation can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-108034, filed Jun. 29, 2021, which is hereby incorporated by reference herein in its entirety.

What is claimed is:

1. An image forming apparatus comprising:
    an image forming unit configured to form an image on a sheet;
    a reverse unit configured to reverse the sheet, on which the image is formed by the image forming unit, such that the reverse unit conveys the sheet in a first direction after conveying the sheet in a second direction opposite to the first direction;
    a re-conveyance path through which the sheet reversed by the reverse unit is conveyed toward the image forming unit, the re-conveyance path including a horizontal conveyance path configured to convey the sheet in a horizontal direction and a curved conveyance path configured to curve upward from the horizontal conveyance path;
    a first roller including a first rotation shaft and a first roller portion supported by the first rotation shaft, the first roller portion being configured to contact and convey the sheet in a sheet conveyance direction, the first roller being arranged immediately upstream of the curved conveyance path in the sheet conveyance direction in the horizontal conveyance path;
    a second roller arranged upstream of the first roller in the sheet conveyance direction in the horizontal conveyance path and including a second rotation shaft and a second roller portion supported by the second rotation shaft, the second roller being configured to contact and convey the sheet in the sheet conveyance direction;
    a plurality of color sensors configured to colorimetrically measure patches on the sheet, the plurality of color sensors being arranged between the first roller and the second roller in the sheet conveyance direction and aligned in a width direction orthogonal to the sheet conveyance direction; and
    a guide surface constituting a part of the horizontal conveyance path and configured to guide the sheet, the guide surface having a plurality of holes corresponding to respective reading positions of the plurality of color sensors,
    wherein the plurality of holes are arranged in a region in the width direction between one end and the other end of the first roller portion and are not arranged outside the region.

2. The image forming apparatus according to claim 1, wherein the plurality of holes are arranged at positions overlapping the first roller portion in the width direction when viewed in the sheet conveyance direction.

3. The image forming apparatus according to claim 1, wherein the first roller portion includes a first roller part supported by the first rotation shaft, and a second roller part arranged at a position different from the first roller part in the width direction and supported by the first rotation shaft.

4. The image forming apparatus according to claim 3, wherein
the plurality of holes includes a first hole and a second hole arranged side by side in the width direction,
the first hole is arranged at a position overlapping the first roller part in the width direction when viewed in the sheet conveyance direction, and
the second hole is arranged at a position overlapping the second roller part in the width direction when viewed in the sheet conveyance direction.

5. The image forming apparatus according to claim 4, wherein the second roller portion includes a third roller part arranged at a position overlapping the first roller part when viewed in the sheet conveyance direction, and a fourth roller part arranged at a position overlapping the second roller part when viewed in the sheet conveyance direction.

6. The image forming apparatus according to claim 1, further comprising:
a drive source configured to output a driving force; and
a driving roller driven by the driving force of the drive source,
wherein the first roller is a driven roller that is driven to rotate by driving of the driving roller.

7. The image forming apparatus according to claim 1, wherein the image forming unit corrects an image to be formed on the sheet based on a color of image information read by the plurality of color sensors.

8. The image forming apparatus according to claim 1, further comprising a plurality of pressing roller portions configured to press the sheet toward the plurality of holes.

* * * * *